US012719307B2

(12) United States Patent
Paulick et al.

(10) Patent No.: US 12,719,307 B2
(45) Date of Patent: Aug. 25, 2026

(54) SYSTEM FOR DESIGNING A LOW-VOLTAGE DISTRIBUTION NETWORK AT A SECONDARY UNIT SUBSTATION

(71) Applicant: WAGO Verwaltungsgesellschaft mbH, Minden (DE)

(72) Inventors: Martin Paulick, Bad Oeynhausen (DE); Carsten Eilers, Rahden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 389 days.

(21) Appl. No.: 17/511,212

(22) Filed: Oct. 26, 2021

(65) Prior Publication Data

US 2022/0052552 A1 Feb. 17, 2022

Related U.S. Application Data

(63) Continuation of application No. PCT/EP2020/060665, filed on Apr. 16, 2020.

(30) Foreign Application Priority Data

Apr. 26, 2019 (DE) ..................... 20 2019 102 368.6

(51) Int. Cl.
*H02J 13/10* (2026.01)
*G05B 17/02* (2006.01)
(Continued)

(52) U.S. Cl.
CPC .............. *H02J 13/10* (2026.01); *G05B 17/02* (2013.01); *H02J 13/12* (2026.01); *H02J 13/333* (2026.01);
(Continued)

(58) Field of Classification Search
CPC ........... H02J 13/00034; H02J 13/00002; H02J 13/00016; H02J 13/00028;
(Continued)

(56) References Cited

U.S. PATENT DOCUMENTS

| | | | |
|---|---|---|---|
| 8,706,309 | B2 | 4/2014 | Schweitzer, III et al. |
| 10,461,579 | B2 | 10/2019 | Froehner et al. |

(Continued)

FOREIGN PATENT DOCUMENTS

| | | | | | |
|---|---|---|---|---|---|
| CN | 102593839 | B | * | 12/2013 | |
| CN | 108448461 | A | * | 8/2018 | ............. G01D 21/02 |
| DE | 102010026174 | A1 | | 1/2012 | |
| EP | 2521237 | A1 | | 11/2012 | |
| EP | 2592709 | A1 | | 5/2013 | |
| EP | 3107174 | A1 | | 12/2016 | |
| KR | 20130057663 | A | * | 6/2013 | |

(Continued)

OTHER PUBLICATIONS

International Search Report dated May 14, 2020 in corresponding application PCT/EP2020/060665.

*Primary Examiner* — Kamini S Shah
*Assistant Examiner* — Michael Tang
(74) *Attorney, Agent, or Firm* — Muncy, Geissler, Olds & Lowe, P.C.

(57) ABSTRACT

A system, having a controller, with a 3-phase measurement sensor, wherein the 3-phase measurement sensor is connected at least for current measurement to a low-voltage feeder of a secondary unit substation, and wherein a distribution network with producers and/or consumers is connected to the low-voltage feeder. The controller and the 3-phase measurement sensor are arranged in the secondary unit substation. The controller has a data interface for detecting electrical measurement values of the connected 3-phase measurement sensor with associated timestamp. The controller has a communication interface for connection to a higher-level unit outside of the secondary unit substation. The controller has a first memory area in a local memory for storing the measurement values with associated timestamp.

18 Claims, 6 Drawing Sheets

(51) Int. Cl.

| | |
|---|---|
| ***H02J 13/12*** | (2026.01) |
| ***H02J 13/333*** | (2026.01) |
| ***H04L 41/12*** | (2022.01) |
| *G06F 3/04815* | (2022.01) |
| *G06F 3/04842* | (2022.01) |

(52) U.S. Cl.
CPC .......... *H04L 41/12* (2013.01); *G06F 3/04815* (2013.01); *G06F 3/04842* (2013.01)

(58) Field of Classification Search
CPC ...... H02J 13/00001; H02J 3/00; G05B 17/02; H04L 41/12; G06F 3/04815; G06F 3/04842; Y02B 90/20; Y02E 60/00; Y04S 10/16; Y04S 10/30; Y04S 10/40; Y04S 40/124
USPC .......................................................... 700/291
See application file for complete search history.

(56) References Cited

U.S. PATENT DOCUMENTS

2009/0265042 A1* 10/2009 Mollenkopf ............. H04Q 9/00 700/298
2012/0029897 A1 2/2012 Cherian et al.
2013/0187454 A1* 7/2013 Timbus ................... H02J 3/388 307/23
2017/0222477 A1* 8/2017 Froehner ........... H02J 13/00028
2018/0017602 A1* 1/2018 Gavrilov ................ G01R 31/42
2020/0278384 A1* 9/2020 Merkle ................ G01R 15/186

FOREIGN PATENT DOCUMENTS

WO WO2011126732 A1 10/2011
WO WO2012037989 A2 3/2012
WO WO2016023585 A1 2/2016
WO WO2010057516 A1 5/2022

* cited by examiner

SYSTEM FOR DESIGNING A LOW-VOLTAGE DISTRIBUTION NETWORK AT A SECONDARY UNIT SUBSTATION

This nonprovisional application is a continuation of International Application No. US PCT/EP2020/060665, which was filed on Apr. 16, 2020, and which claims priority to German Patent Application No. 20 2019 102 368.6, which was filed in Germany on Apr. 26, 2019, and which are both herein incorporated by reference.

BACKGROUND OF THE INVENTION

Field of the Invention

The present invention relates to a system for designing a low-voltage distribution network at a secondary unit substation.

Description of the Background Art

Low-voltage networks are a part of the electricity network for the distribution of electrical energy, e.g., to an electrical end user (low-voltage equipment) and are routed by many regional distribution system operators. To avoid power losses, low-voltage networks are limited in spatial extent to a range of a few 100 m to a few kilometers. They are therefore fed regionally via secondary unit substations, also known as transformer stations, from a higher-level medium-voltage network. In contrast to the other voltage levels, in large areas of Europe, low-voltage grids are not structured as three-wire systems, but as four-wire systems, in order to enable the connection of single-phase consumers. They are usually operated with a mains voltage of 230V/400 V (single phase/three phase) up to 1000 V.

From EP 2 592 709 A1 a method for controlling the stability of a low-voltage network is known, in which a low-voltage network is supplied with electric current by a substation transformer. The low-voltage network has a main power line, with electric current being conducted from the main power line via a network branching point into at least one secondary power line to which at least one electricity consumer (consumer) and/or one electricity producer (feeder) is/are connected. The secondary power line with the consumer and/or feeder connected to it forms a self-sufficient network district. At the network branching point, at least one sensor is arranged at which the secondary power line branches off from the main power line. The sensor is used to measure the current flow in the secondary power line and/or the voltage on the secondary power line.

WO 2011/126732 A1, which corresponds to US 2012/0210723, discloses a system and a method for calculating load models and associated tunable parameters that can be used to describe the behavior of consumers connected to an electrical power distribution system. The load models can be used to predict variations in demand caused by changes in the supply voltage and can be used to determine an optimized control strategy based on the load dynamics.

Furthermore, EP 3 107 174 A1 describes a method for operating an energy supply network with a sub-network comprising electrical loads and/or sources, to which a decentralized control device is assigned, by means of which, using state values indicating a current electrical operating state of the sub-network, control signals are generated which are used to control components of the sub-network. The decentralized control device comprises a state estimation device by means of which the state values are estimated using input signals supplied to the state estimation device. The state values are checked by means of an evaluation device as to whether they indicate an undesired electrical operating state of the sub-network of the power supply network, and whether or not a control signal is generated if the state values indicate an undesirable electrical operating state. In order to be able to carry out the state estimation comparatively simply, and without the need for complex measurement technology to be provided in the sub-network, it is proposed that the state estimation device is supplied with input signals which indicate a state in the region of the sub-network and/or an electrical state of the sub-network at least at one measuring point associated with the sub-network. The state estimation device comprises an artificial neural network which is trained in such a way that it determines the state values using the input signals.

From the publication WO 2012/037989 A1, a method for computer-aided energy distribution in a decentralized energy network is known, in which, during operation of the energy network, an improved control of active powers provided at various points of the energy network is proposed by means of a mathematical optimization method. In particular, the energy consumption or the energy feed-in of decentralized energy consumers or energy producers is controlled on the basis of an evaluation of measurement values.

Furthermore, a method for determining electrical load flows in an electrical power supply network is known from the publication WO 2010/0357516 A1, wherein load profiles of consumers are adjusted dynamically on the basis of measurement values during operation of the energy supply network.

SUMMARY OF THE INVENTION

It is therefore an object of the present invention to provide a system that improves the design of a low-voltage distribution network at a secondary unit substation as far as possible.

Accordingly, a system is provided comprising a controller and a number of 3-phase measurement sensors. A 3-phase measurement sensor is connected to a low-voltage output of a secondary unit substation at least for current measurement. A distribution network with producers and/or consumers is connected to the low-voltage output.

The controller and the 3-phase measurement sensor are located in the secondary unit substation.

The controller has a data interface for detecting electrical measurement values of the connected 3-phase measurement sensor with associated timestamp.

The controller has a communication interface for connection to a higher-level unit outside the secondary unit substation.

The controller has a first memory area in a local memory for storing the measurement values with associated timestamp.

The controller includes a second memory area in the local memory for storing network topological data. The network topological data comprises both line profiles of the distribution network as well as consumer profiles of the consumers and/or producer profiles of the producers of the distribution network.

The controller comprises a computing unit set up to perform the steps of:

Receiving a request via the communication interface for outputting an energy flow in the distribution network, Selecting a period for measurement values with a time-stamp within the period, Calculating values of the energy flow based on the network topological data and the measurement values of the time period, and Providing a calculation result in a server of the controller for transmission via the communication interface.

In this context, a 3-phase measurement sensor is to be understood as at least one 3-phase measurement sensor, so that with the data interface of the controller one, two or more 3-phase measurement sensors can be connected. The 3-phase measurement sensor is advantageously configured to provide separate current measurements for conductors $L_1$, $L_2$, $L_3$ and N. The 3-phase measurement sensor is, for example, the 3-phase power measurement module 750-495 with associated Rogowski coils of the applicant, by means of which a plurality of electrical quantities can be measured, such as current, voltage, active power, reactive power, phase, frequency, etc. Alternatively, other 3-phase measurement sensors can also be used.

For example, the PFC200 offered by the applicant can be used as a controller. Alternatively, other controllers can also be used.

A low-voltage feeder is to be understood as an indeterminate number, i.e., as at least one low-voltage feeder. Typically, a secondary unit substation has one, two or more low-voltage feeders. A low-voltage feeder is typically part of a low-voltage network, which is also referred to as a distribution network.

In addition to the secondary unit substation, the distribution network can have a consumer, such as a vehicle charging station, a house connection and/or a producer, such as a combined heat and power plant or a photovoltaic system. A producer may also be referred to as a feeder. A distribution network may have a plurality of consumers and producers.

With the arrangement of controller and 3-phase measurement sensor locally in the secondary unit substation, data transmission of the measurement values for evaluation of the measurement values to a higher-level unit outside the secondary unit substation is not required. For arrangement, controller and 3-phase measurement sensor are located in a building or housing of the secondary unit substation.

The controller has two different interfaces. The controller comprises at least the data interface and the communication interface. In addition, the controller may have further interfaces, such as a service interface for maintenance or configuration purposes. The data interface provides the connection for one or more 3-phase measurement sensors. The communication interface is, for example, a network interface for data transmission by means of protocols to or from the higher-level unit. For example, the communication interface is designed to send and receive using an Ethernet-based protocol.

The higher-level unit is not located in the secondary unit substation, but is connected, for example, by a LAN cable. The higher-level unit may be, for example, a specific computer or a cloud application on a locally remote server. Alternatively, the communication interface may be a USB interface to which a computer that can be located outside the secondary unit substation can be connected.

The local memory of the controller can be read and written by the computing unit without a connection via the communication interface. The local memory is therefore directly connected to the computing unit. Accordingly, it is possible for each measurement value of the 3-phase measurement sensor to be written directly to the first memory area, for example by means of a controller-contained DMA controller (DMA—Direct Memory Access).

The local storage of the network topological data in the second memory area contains data from the distribution network connected to the secondary unit substation. Accordingly, the data volume is limited to the connected distribution network. Likewise, a result data volume is limited to the connected distribution network. Transmitting larger amounts of data via the communication interface is therefore not necessary. For example, necessary changes to the network topological data are transmitted via the communication interface and also stored in the second memory area of the local memory.

Due to the arrangement of the controller in the secondary unit substation, the calculation of the energy flow can also be performed locally in the secondary unit substation by the controller's computing unit. For this purpose, the calculation algorithm is advantageously optimized in such a way that it makes do with the relatively small computing power of the controller's computing unit. It is not necessary to provide additional external computing power, for example in the cloud. Accordingly, the calculation in the controller can be carried out autonomously in the secondary unit substation.

The steps of receiving, selecting, calculating and providing executed in the controller do not necessarily have to be executed in the specified order. For example, it is sufficient that a request is received only once and then selection and calculation are performed cyclically. Alternatively, selection and calculation can be event-driven, e.g., every time a request is received. For example, the provision of the calculation result may be continuous. Alternatively, it is possible that the calculation result is provided based on the request.

The server implemented in the controller to provide the calculation result may be a web server that transmits the calculation result to clients such as web browsers. The web server may be, for example, web server software in the controller.

According to an advantageous further development, the server of the controller is arranged to provide a number of services which can be controlled via the communication interface. At least one service is thereby provided. Services are, for example, predetermined views of the measurement values or calculation results, for example cartographic views or limit value violations or drag pointers or the like. Further services may be calculation configurations, for example simulation of changes in the distribution network, averaging over longer periods of time, etc.

According to an advantageous further development, the server of the controller is arranged to provide the calculation results by means of graphical objects. Graphical objects may advantageously comprise invariant graphical elements and/or time-varying graphical elements and/or numbers and/or text. For example, for a particular type of consumer, a symbol and a view of a virtual measuring device are stored as graphical objects so that a graphical object can be generated automatically from the storage for all consumers of this type.

According to an advantageous further development, the graphical objects are assigned to each other and to one of the low-voltage feeders based on the network topological data. For example, assignment is made by means of local positioning within a map or a two- or three-dimensional structure.

According to an advantageous further development, at least one of the graphical objects is assigned to a calculation result. The assignment can be formed, for example, by a numerical value and/or by the size of a graphical element and/or by the color of a graphical element.

According to an advantageous further development, the graphical objects are transmittable via the communication interface. Preferably, the graphical objects are transmittable to the higher-level unit. For example, it is possible to transmit the objects with an associated structure. Alternatively, the structure can also be specified by a higher-level program, so that the objects can be integrated in this program.

According to an advantageous further development, the server of the controller is set up to assign a time course of calculated electrical values to an object. Thereby, the temporal course of the calculated electrical values and/or a generated graphical representation of the temporal course of the calculated electrical values can be transmitted via the communication interface. For example, the energy flow through a cable can be calculated for a period of time. Average values of the calculated energy flow through the cable, for example for 15 minutes, are entered as a value in a diagram and the diagram as a graphical object associated with the cable is transmitted via the communication interface. Accordingly, diagrams for consumers or feeders are automatically created based on the calculation results and transmitted via the communication interface.

According to an advantageous further development, the server of the controller is arranged to receive selection control data via the communication interface. Advantageously, the server is arranged to select a number of the graphical objects based on the selection control data. For example, the selection control data includes a number of cables in an area of the distribution network previously selected by the user, for example by an input. Based on the selection control data, the calculation results of the energy flow for the cables, for example in the form of tables or diagrams, are transmitted via the communication interface. In addition, other calculation results, such as those associated with the energy flow—current, voltage, phase, active power, etc.—or threshold value violations or the like can be transmitted via the communication interface as numbers and/or text and/or a graphic element of the graphic objects.

According to an advantageous further embodiment, the server of the controller is adapted to arrange the graphical objects in a two-dimensional or three-dimensional space based on the network topological data. Advantageously, the arrangement in the space corresponds to the geography of the distribution network. For example, the arrangement may be a structure of an abstracted view or in a concrete cartographic representation.

According to an advantageous further development, the controller is arranged to send control data to a producer controller of a producer and/or a consumer controller of a consumer via a control connection. The controller is set up to generate the control data. Advantageously, the controller is set up to generate the control data autonomously, in particular based on the measurement values. Likewise, it is possible that the control data generated by the controller is dependent on communication with the higher-level unit. For example, for energy management, the higher-level unit determines the power output of the secondary unit substation, so that the energy withdrawal of larger consumers depends on the power output.

The controller can be set up to receive data via the control connection from the producer controller and/or the consumer controller. For example, the consumer controller may provide feedback on energy consumption over a period of time. The controller can adjust the profile of the consumer based on the feedback.

A coupling circuit can be provided which connects the controller to a low-voltage feeder. The coupling circuit is set up to establish the control connection via the distribution network connected to the low-voltage feeder. Such a coupling circuit is, for example, a power line modem.

The controller and/or the coupling circuit can be set up to transmit the control data in encrypted form via the control connection. The encrypted control connection can take place, for example, by means of https or VPN tunnel.

The controller can be arranged to generate the control data based on the calculation result. For example, a plurality of feeders and a plurality of consumers may cause, for example, a local overload in a cable section that rarely occurs during normal control operation. The local overload may be determined based on the calculation results, and consumers can temporarily throttle or switch off the power consumption to reduce the load in the cable section. In this way, a distribution network can be optimally utilized without major safety reserves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
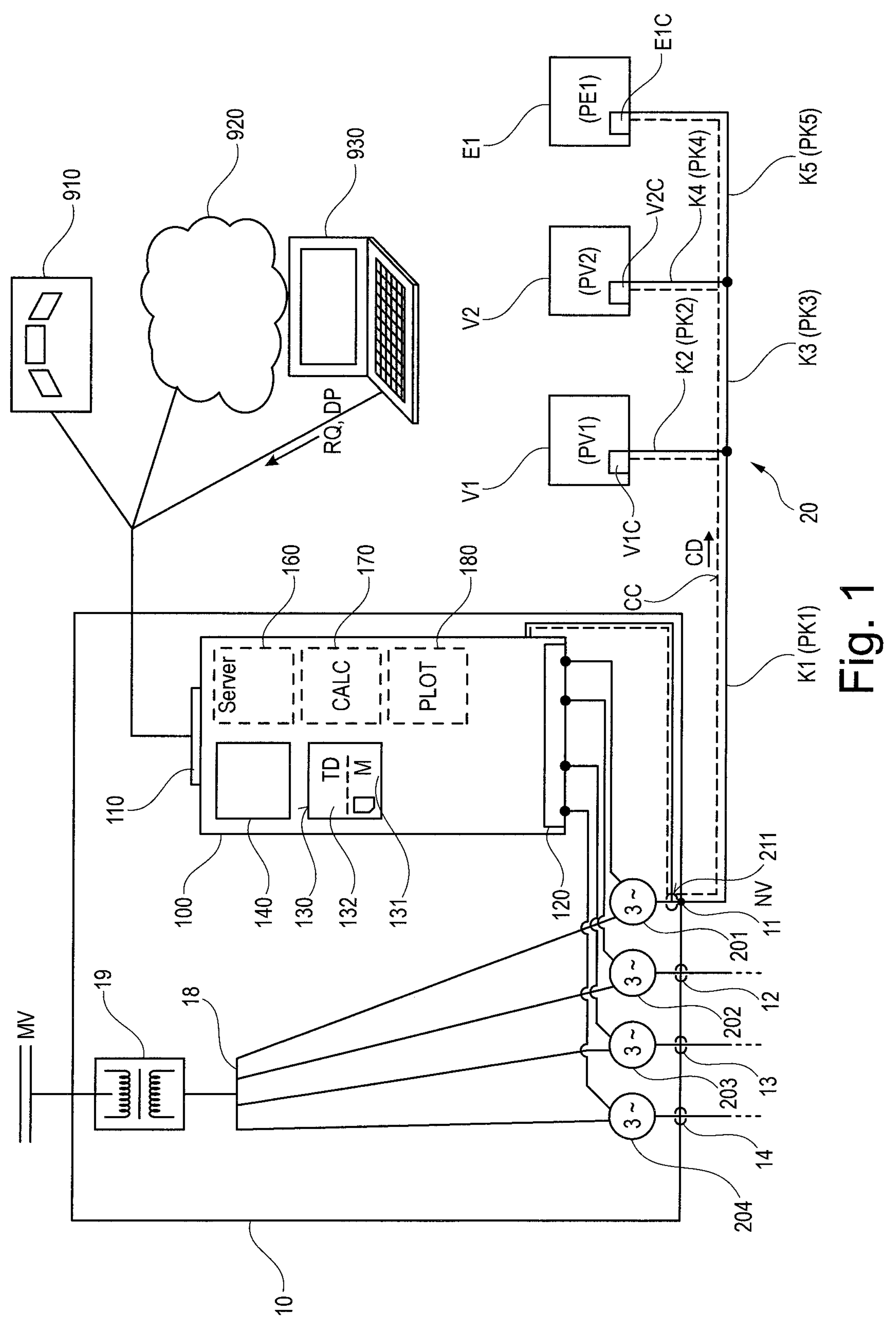
FIG. 1 is a schematic representation of an embodiment of a secondary unit substation and a distribution network and higher-level units.

FIG. 1 schematically shows a secondary unit substation 10 (ONS) with a distribution network 20. The secondary unit substation 10 has, for example, a transformer 19 for transformation between medium voltage MV and low voltage NV. For the low-voltage side NV, the secondary unit substation 10 has a number of low-voltage feeders 11, 12, 13, 14 which are interconnected by a busbar 18 (shown schematically in FIG. 1). The electrical distribution network 20 for electrical energy was designed for a centralized energy system in the past and will be modified as decentralization progresses. In addition to decentralized volatile generation, other social and infrastructural changes will lead to changes in the loads on the power grid. For example, load profiles V1, V2 can become obsolete. Electric vehicles are conquering households and can represent significant, additional consumers V1, V2. In addition, battery storage and heat pumps are becoming increasingly widespread. Digitized data provide transparency about the grid conditions, which is needed for investment and operational planning. Transparency is the prerequisite for optimal grid management.

With the use of a controller 100 in the secondary unit substation 10, the operator is to obtain a better assessment of the performance of its electrical distribution network 20. The secondary unit substation 10 thereby obtains a digital intelligence and may therefore be referred to as a digital secondary unit substation dONS. In this regard, a calculation application 170 is implemented on the controller 100 for calculating an energy flow EF in the distribution network 20 shown, e.g., in FIG. 3. Without the calculation application 170, the operator must perform a worst-case analysis for his distribution network 20 due to the lack of this information. As a result, the operator may refuse to add feeders E1 or consumers V1, V2 or invest in earthworks for a more powerful underground cable, even though this is not physically necessary. The calculation application 170 in the secondary unit substation 10 thereby follows a "bottom-up approach" in the distribution network 20.

In this case, the calculation application 170 is executed locally on a computing unit 140 of the controller 100 and enables a dynamic calculation of the energy flow EF in the distribution network 20. In this case, the controller 100 in the secondary unit substation 10 is locally arranged. An extensive transmission of measurement data M over larger distances is not necessary. Moreover, the measurement data M are practically available immediately as real-time data for a calculation of the distribution network 20. Advantageously, thereby preferably each secondary unit substation 10 of an operator is equipped with a controller 100, which is set up to perform the calculation application 170 for exactly that distribution network 20 connected to the respective secondary unit substation 10. This decentralized solution approach is optimized for a decentralized problem in the distribution network 20.

The network topological data TD and the measurement values M are used as input data in the calculation by the calculation application 170. In addition, further data, for example current measurement data of a consumer V2, can flow into the calculation. Likewise, weather data, such as the current solar irradiation, wind or weather forecasts are included in the calculation if, for example, a photovoltaic system is provided as a feeder E1.

The solution shown in FIG. 1 achieves a number of advantages. For example, the operator is supported in the approval process for new photovoltaic and wind power plants and charging station infrastructure by calculating real load profiles, which previously could be designed only with a broad worst-case scenario. Unnecessary earthworks are avoided. A cost reduction in the distribution grid 20 is achieved by operating in the most favorable (lowest) voltage band (e.g., 230V±10%). In addition, the solution serves as a basis for the development of decentralized, stand-alone grids (microgrids).

FIG. 1 shows in the secondary unit substation 10 that the controller 100 is exemplarily equipped with four 3-phase measurement sensors 201, 202, 203, 204. Controller 100 and 3-phase measurement sensors 201, 202, 203, 204 are arranged in the interior of the secondary unit substation 10 in the exemplary embodiment of FIG. 1. Each of the four 3-phase measurement sensors 201, 202, 203, 204 is connected to at least one low-voltage feeder 11, 12, 13, 14 of the secondary unit substation 10 for measuring current and voltage. For the low-voltage NV, for example, a voltage band of 110V/230V is used. A distribution network 20 with producers E1 and/or consumers V1, V2 is connected to the first low-voltage feeder 11. In the schematic example shown in FIG. 1, two consumers V1, V2 and a feeder E1 are connected via cables K1, K2, K3, K4, K5. It is clear to the person skilled in the art that the distribution network 20 can be considerably more extensive in reality. In addition, further distribution networks can be connected to the other low-voltage feeders 12, 13, 14. This is indicated by dashed lines in FIG. 1.

In the exemplary embodiment of FIG. 1, the controller 100 has a data interface 120 for acquiring electrical measurement values M of the connected 3-phase measurement sensors 201, 202, 203, 204. The measurement values M are associated with timestamps. For example, the data interface 120 has analog inputs with analog-to-digital converters, which can be used to convert analog data from the 3-phase measurement sensors 201, 202, 203, 204 into digital data and provide them with timestamp values. Alternatively, it is possible that the 3-phase measurement sensors 201, 202, 203, 204 themselves comprise analog-to-digital converters and the data interface 120 receives digital data. The measurement values M of the 3-phase measurement sensors 201, 202, 203, 204 are stored at least locally in a local memory 130, for example a flash memory, a memory card or a hard disk of the controller 100. If required, the measurement values M can furthermore be read out from the local memory 130.

The controller includes in a local memory 130 a first memory area 131 for the storage of the measurement values M with associated timestamp. The controller comprises a second memory area 132 in the local memory 130 for storing network topological data. The network topological data have both line profiles PK1, PK2, PK3, PK4, PK5 of the lines/cables K1, K2, K3, K4, K5 of the distribution network 20 and consumer profiles PV1, PV2 of the consumers V1, V2 and/or producer profiles PE1 of the producers E1 of the distribution network 20.

The controller 100 comprises a computing unit 140 on which a software program is executable. The software program in the exemplary embodiment of FIG. 1 comprises a server 160, in particular a web server, and a computing application 170. The software program on the computing unit 140 can, in the exemplary embodiment of FIG. 1, execute a number of program steps.

The controller 100 comprises a communication interface 110 for connection to a higher-level unit 910, 920, 930 outside the secondary unit substation 10. In the exemplary embodiment of FIG. 1, the higher-level unit is, for example, a control room/control center 910, a cloud 920, or a computer 930. The communication interface 110 is, for example, an Ethernet-based interface. Advantageously, a configuration of several (at least 2) IP addresses per port is provided, so that separate connections, each with a limited range of functions, are possible via the communication interface 110. For example, a separate IP address can be set for the web server 160. Advantageously, a configuration option for setting a secure connection to each IP address can be set, especially a setting of several (min. 2) OpenVPN tunnels, incl. firewall settings.

The computing unit 140 is arranged to separate parameterization (telecontroller—SCADA network) and visualization (planner/network master—office network). Preferably, two different visualizations have been created for telecontrollers and planners, which are accessed via different IP addresses.

In the embodiment of FIG. 1, there is an OpenVPN tunnel from the SCADA network and an OpenVPN tunnel from the office network to the controller 100. These networks are separate. Different applications are accessible from the SCADA network than from the office network. Preferably, separate web servers are provided for this purpose (not shown in FIG. 1).

The computing unit 140 is arranged to receive a request RQ via the communication interface 110 for outputting a power flow in the distribution network 20. For this purpose, for example, the request RQ is initiated by means of the computing unit 930 and transmitted to the controller 100 via the Internet. In addition to selecting a time period, the computing unit 140 is set up for measurement values M with a timestamp within the time period. The selection of the time period is advantageously associated with the request RQ or included in the request RQ itself.

When the computing unit 140 receives the request RQ, a calculation is triggered in a subsequent step. The computing unit 140 is set up by means of the computing application 170 to calculate values of the energy flow based on the network topological data TD and the measurement values M of the time period. The calculation results may be stored for later retrieval. Alternatively, the calculation results are immediately provided in the server 160 of the controller 100 for transmission via the communication interface 110.

The web server 160 can provide a plurality of basic applications in different languages to the user, for example using language selection.

A web page of the web server 160 is accessible after authentication via username and password. Preferably, different user rights, such as read only, access to data plotter 180 and data logger or administration, are available in the base application. In addition, different user levels are preferably assigned for resetting the displays (e.g., drag pointer) or for configuration (assignment, creation of the network topology TD, etc.).

In the embodiment of FIG. 1, the computing unit 140 is arranged to execute a data plotter 180. The data plotter 180 is arranged to display calculated and simulated values of the calculation result. In the exemplary embodiment of FIG. 1, the calculation unit 140 is arranged to reduce the amount of data of the calculation result. For example, values are grouped or averaged depending on their relevance, for example, and transmitted in different cycles. The controller 100 is set up to transmit uncompressed or compressed live data. The controller 100 is also arranged to determine and output historical measurement data M and calculation results.

Figure 2:
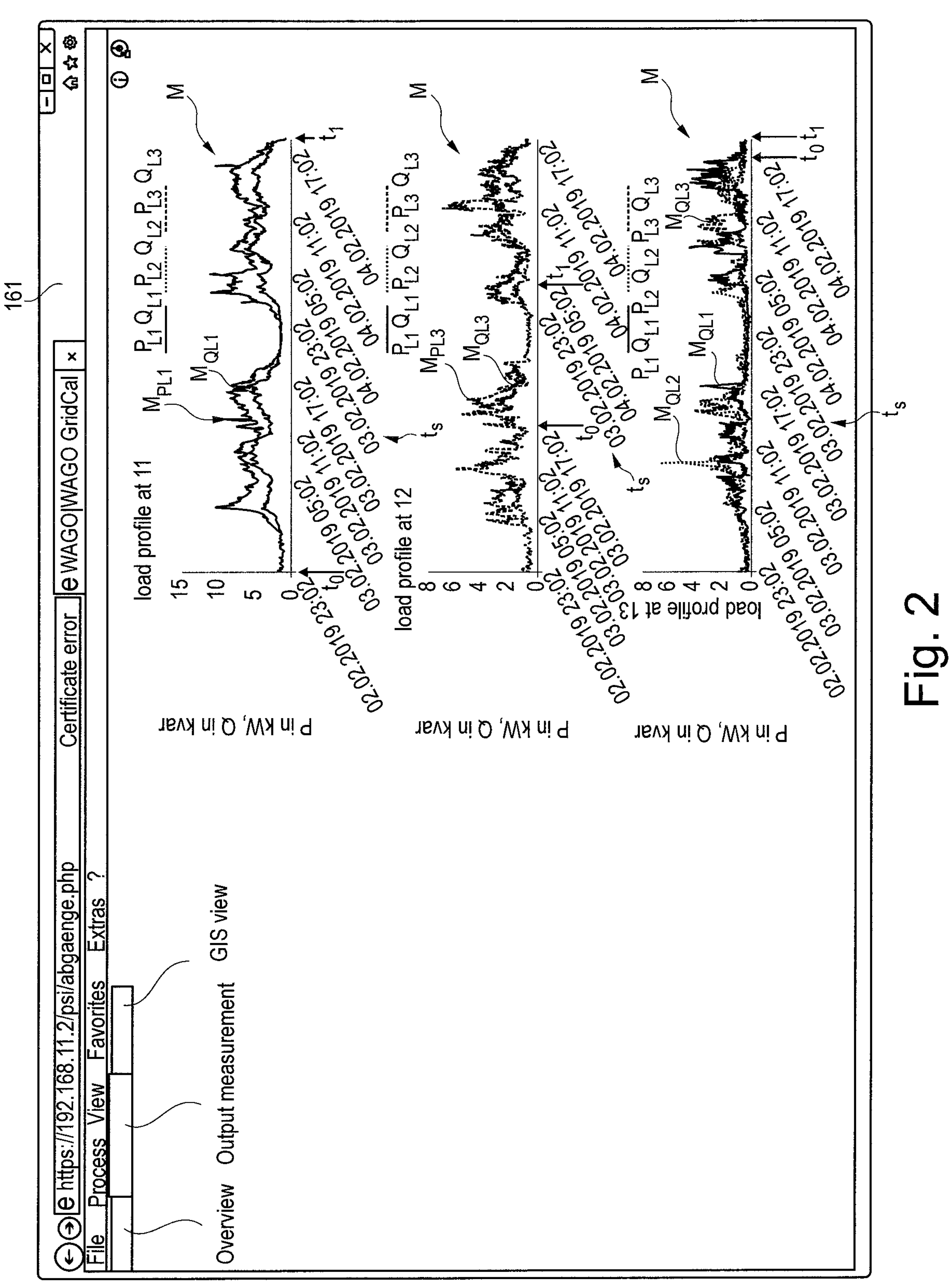
FIG. 2 is representations of schematic diagrams of measurement values.

In the embodiment shown in FIG. 2, measurement values M are shown in different diagrams. Examples shown are measurement values at the low-voltage feeder 11, 12 and 13.

Measurement values MPL1, MPL3, of the active power and measurement values of the reactive power MQL1, MQL2, MQL3 are shown as examples. A timestamp tS is assigned to each measurement value M. Measurement values M and timestamps tS are stored in the local memory 130 in the secondary unit substation 10. The points in time t0 and t1 are selected, for example automatically, or based on a user input. The two points in time t1 and t0 each determine a time period t1-t0 within which measurement values M with timestamp tS lie. The representation can be updated continuously, for example, so that both historical data and real-time data can be seen in the diagrams.

In addition, voltage histograms of the transformer terminals can be displayed (not shown in FIG. 2).

Figure 3:
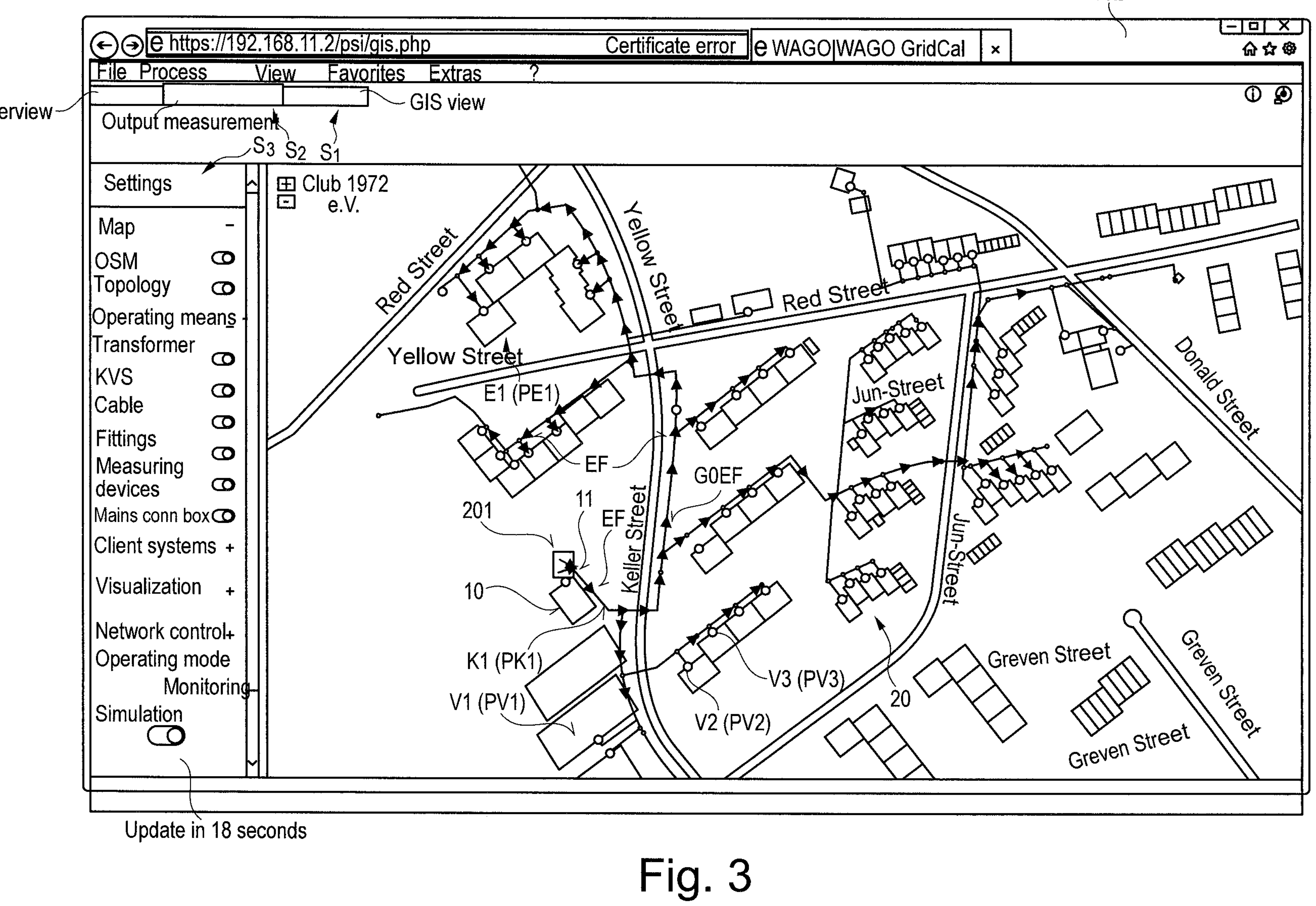
FIG. 3 is a schematic web browser view of an exemplary embodiment.

In the exemplary embodiment of FIG. 3, a plot based on the network topological data TD is output and schematically displayed via a web browser. In the exemplary embodiment of FIG. 1, the web server 160 may display various information and events with a web page 162, such as

- General information on the secondary unit substation
- Drag pointer for the transformer 19 and for each individual feeder 11 (selectable in the exemplary embodiment of FIG. 3, but not shown),
- A timeframe image, e.g., of the last 30 days, configurable with display of the represented timeframe t1-t0 (selectable in the exemplary embodiment of FIG. 3, but not shown),
- Minimum and maximum values of, e.g., power and voltage of a predefinable number of days for transformer 19 and feeders 11 (selectable in the exemplary embodiment of FIG. 3, but not shown),
- Date display since when the measurement values M and/or result values are being determined (selectable in the exemplary embodiment of FIG. 3, but not shown).

Via the web page 162 of the web server 160, input options are to be provided for the execution of provided services S1, S2, S3, wherein, for example:

- drag pointers can be reset (selectable in the exemplary embodiment of FIG. 3, but not shown), or
- the entire representation can be reset (selectable in the exemplary embodiment of FIG. 3, but not shown), and/or
- individual services S1, S2, S3 can be switched on or off,
- a date and/or a time can be entered (selectable in the exemplary embodiment of FIG. 3, but not shown).

In the embodiment of FIG. 3, live data of the calculation results is shown. The calculation result is represented as a graphical object GOEF. In the exemplary embodiment of FIG. 3, the energy flow in each cable K1 is represented in the form of an arrow, wherein a graphical property of the graphical object GOEF represents the magnitude of the energy flow EF. By way of example, it is shown that the size of the arrow correlates with the magnitude of the energy flow EF. Alternatively, colors or other graphical properties can be used.

In the exemplary embodiment of FIG. 1, the server 160 of the controller 100 is arranged to provide a number of services S1, S2, S3 which are controllable via the communication interface 110. Examples of services S1, S2, S3 are shown schematically in the exemplary embodiment of FIG. 3. For example, services S1, S2, S3 are selectable via a user interface 162. A first service S1 enables a cartographic view of the calculation results. A second service S2 enables a view of measurement values M at a low-voltage feeder 11, such as those schematically shown in FIG. 2. A third service S3 enables various settings to be made. For example, the settings can be used to permanently or temporarily add or remove graphical objects. Furthermore, in the exemplary embodiment of FIG. 3, it is shown that, as associated services, it is possible to switch between two operating modes "Simulation" and "Monitoring".

FIG. 3 schematically illustrates a web page 162 based on HTML5, for example. The web page 162 is part of the web server 160 and enables an input of the network topology via a WEB visualization and/or a continuous network calculation and/or a visualization of the energy flow EF. For example, the web page 162 is displayed using a browser of the computer 930 in FIG. 1.

The representation of real-time data in the exemplary embodiment of FIG. 3 enables, for example, a configuration of the measuring terminals and/or an assignment of measurement data and/or calculation data including, for example, minimum values and/or maximum values of current and/or voltage and/or unbalance factor to a low-voltage feeder 11 and/or directly displaying real-time values in the distribution network 20. A network master should thus be enabled to assign any problems to a feeder 11.

By means of the controller 100, the network topology of the low-voltage strings of the distribution network 20 at the secondary unit substation 10 can be planned by means of the WEB visualization as shown in FIG. 3, for example to perform a continuous network calculation. The distribution network operator can use this functionality to perform an analysis of the distribution network 20 in order to decide on the approval of further additions to regenerative energy plants or necessary grid expansion. Another advantage is the setting of the most favorable voltage band on the low-voltage side NV, which allows the supplier to operate the low-voltage network NV more economically.

FIG. 3 schematically illustrates a network topology based on network topological data TD. The following are shown as examples in the distribution network 20: a secondary unit substation 10 with a 3-phase measurement sensor 201, consumers V1, V2, V3 with different consumer profiles PV1, PV2, PV3 and feeders E1 with feeder profile PE1. The profiles, in particular the consumer profiles PV1, PV2, PV3 are advantageously adaptable. For example, the consumer profiles PV1, PV2, PV3 are updated based on real data. The energy flow EF based on measurement values M and net topological data is represented in the form of a graphical object GOEF. For this purpose, the server 160 of the controller 100 is arranged to provide the calculation results using graphical objects GOEF. FIG. 3 shows, by way of example, that each value of the energy flow EF is associated with an arrow of corresponding size as a graphical object GOEF. Also, consumers V1, V2, V3 and feeders E1 are each represented by graphical objects GOEF.

In the embodiment of FIG. 1, the server 160 of the controller 100 is set up to arrange the graphical objects GOEF based on the network topological data TD in a two-dimensional or three-dimensional space. The two-dimensional or three-dimensional space is typically on a display, augmented reality glasses or the like. The arrangement in the space advantageously corresponds to the geography of the distribution network 20. In the exemplary embodiment of FIG. 3, it is shown that the graphical objects GOEF of, for example, the energy flow EF are displayed distributed over a two-dimensional map. Advantageously, the graphical objects GOEF are shown above the map in a separate layer. For example, the graphic objects GOEF protrude from the map layer or are placed in a layer behind the partially transparent map, e.g., to improve the optical detectability.

In addition to the representation in the exemplary embodiment of FIG. 3, an additional evaluation, for example a threshold value monitoring, can be represented. For example, it is possible to temporarily indicate threshold value violations by a current in a cable using a color change, e.g., from green to red. Also other feedback and/or status messages and/or reporting and/or logging can be implemented in the exemplary embodiment of FIG. 3.

In contrast to FIG. 1, in the exemplary embodiment of FIG. 3, the network topological data TD is shown based on geo information. In the exemplary embodiment, the graphical objects of the distribution network 20 are inserted as layers over a cartographic map. The network topological data TD may be based, for example, on a manual input. For this purpose, the server 160 comprises an input functionality for the user. The input functionality comprises, for example, a projection tool which may enable, for example:

- a manual creation of reduced radial networks with possibilities of branching, and/or
- an input of complex line parameters, annual energy consumption with standard load profiles and/or
- the creation of a project planning database and/or
- data management (concepts and solutions) for network topological data and/or measured and/or calculated result data.

The configuration is advantageously implemented by means of a separate configuration page.

Advantageously, the network topological data TD in the second memory area 132 in the controller 100 is modifiable, for example, remotely configurable by the user. For example, an input option for the network topological data is provided via the server 160. In this regard, the network topological data TD is acquired, for example, by means of a computer 930 and transmitted to the second memory area 132 via the communication interface 110 of the controller 100. Advantageously, the server 160 is arranged to receive change data and to change the network topological data TD based on the modification data. For example, the user can select a cable K1 via the web page in FIG. 3 and virtually connect and lay a new cable. It is also possible to virtually connect a new consumer to the newly laid cable. This is independent of whether the new cable and the new consumer already exist in reality. This can be used for simulation purposes, for example. Accordingly, the network topology can be extended in the horizontal direction, i.e., along the cable extensions, to increase the number of nodes. Advantageously, the number of nodes is limited to a maximum number. Also, it is possible to expand in the distribution network 20 in the vertical direction, i.e., in the number of feeders, in order to introduce a number of network branches. Realistic results can be achieved by this.

In the exemplary embodiment of FIG. 3, the server 160 is arranged to insert a new cable with cable length and/or type, i.e., single or double cable. Advantageously, the computing unit 140 of the controller 100 is arranged to calculate the cable profile of the new cable. In the exemplary embodiment of FIG. 3, the server 160 is arranged for an input of a line load and/or point load. It is possible to enter an annual consumption with allocation to individual profiles (household, commercial, etc.). It is also possible to enter a power of an EEG plant with assignment to the type of plant (PV, CHP . . . ).

As an alternative to a user-based input of changes to the topological data TD, an automated model generation by importing planning data from a geographic information system (Smallworld/Lovion) is provided in the exemplary embodiment of FIG. 1. By importing the planning data, a particularly simple engineering can be achieved. The operators of electrical distribution networks 20 use geographic information systems (GIS) for the planning, maintenance and expansion of their low-voltage networks NV. In the exemplary embodiment of FIG. 1, an import of the data, e.g., in the so-called shapefile format, from a geographical information system is additionally implemented. The import simplifies the input of the network topological data TD into the controller 100. Accordingly, it is possible to import more complex network topologies than would be possible via a manual input via the web page 162 in the exemplary embodiment of FIG. 3. In the exemplary embodiment of FIG. 1, the controller 100 is advantageously arranged to upload the associated network topological data TD from an external storage, for example from the cloud 920, based on an identification code of the own secondary unit substation 10. Subsequently, the network topological data TD are automatically checked that they are suitable for calculation in the calculation application 170.

After importing network topological data TD, manual editing is advantageously blocked. Alternatively, an additional simulation file can be generated which contains network topological changes for simulation purposes.

Figure 4:
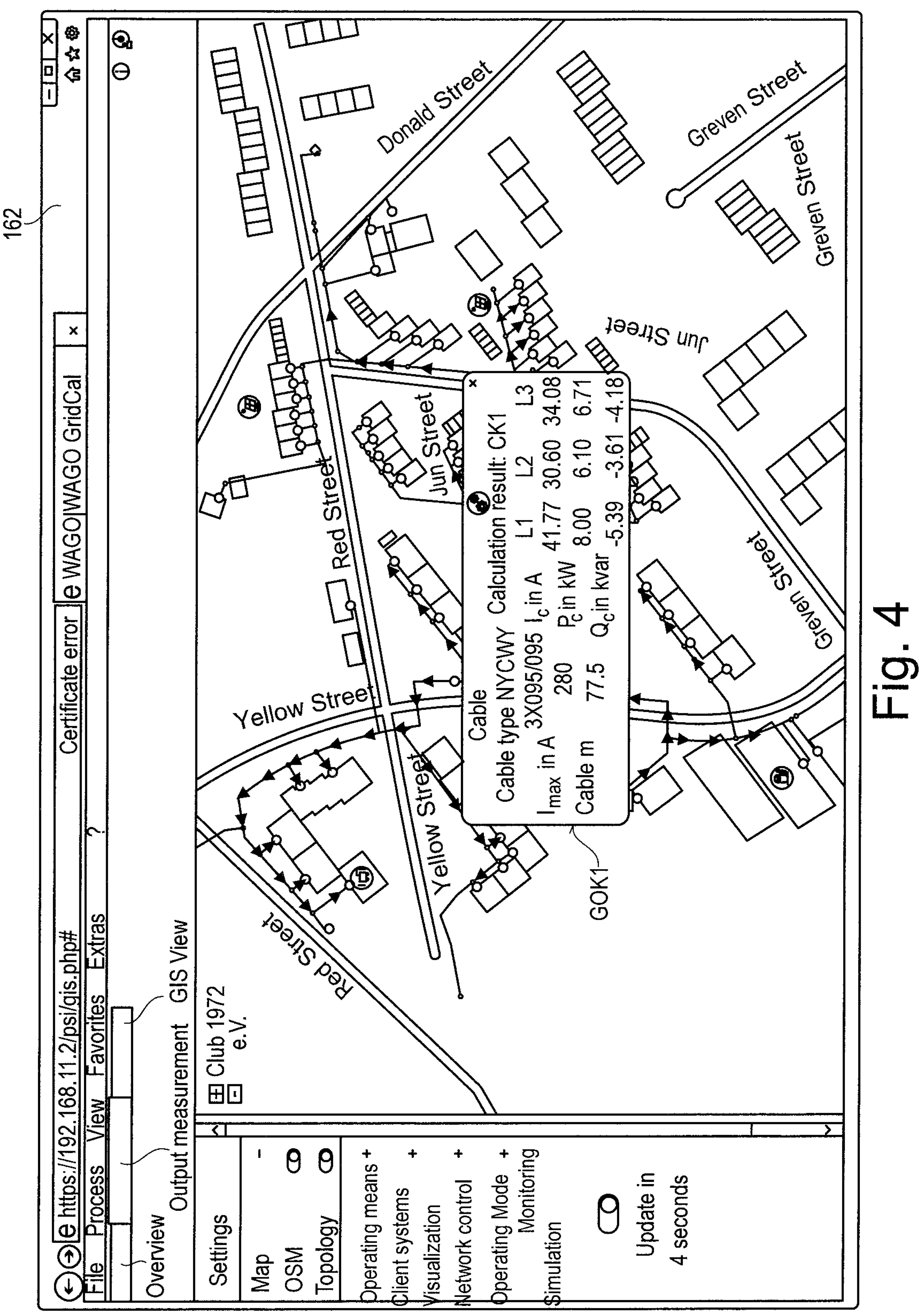
FIG. 4 is a schematic web browser view of another exemplary embodiment.

The server 160 of the controller 100 of the exemplary embodiment of FIG. 1 is configured to provide the calculation results CK1 using graphical objects GOK1. In the exemplary embodiment of FIG. 4, a cable K1 is selected. In the web page 162, the selected cable K1 is graphically marked, for example by spatial and/or color highlighting. The selection may be made, for example, by determining within the web page 162 a mouse click by the user in the area of the representation of the cable K1. Based on the mouse click, selection control data DP is transmitted from, for example, the computer 930 to the server 160 of the controller 100 via the communication port 110. The server 160 is arranged to select a number of graphical objects K1, GOK1 based on the selection control data DP. The server 160 is arranged to display, in addition to marking the cable K1, a window on the web page in the foreground, which forms another graphical object GOK1 that is transmitted via the communication interface 110 to the computer 930, for example.

The server 160 of the controller 100 is arranged to provide the calculation results CK1 for the cable K1 based on the graphical object GOK1. In the exemplary embodiment of FIG. 4, the graphical object GOK1 is in the form of a window or bubble and graphically associated directly with the cable K1 by a spike. The server 160 is arranged to allocate the graphical object GOK1 based on the network topological data TD and to one of the low-voltage feeders (hidden in FIG. 4). In the exemplary embodiment of FIG. 4, the graphical object GOK1 is associated with a calculation result CK1. The graphical object GOK1 shows for each conductor L1, L2, L3, for example, the calculated current value IC in amperes. The graphical object GOK1 is then transmitted to the computer 930 via the communication interface 110

Figure 5:
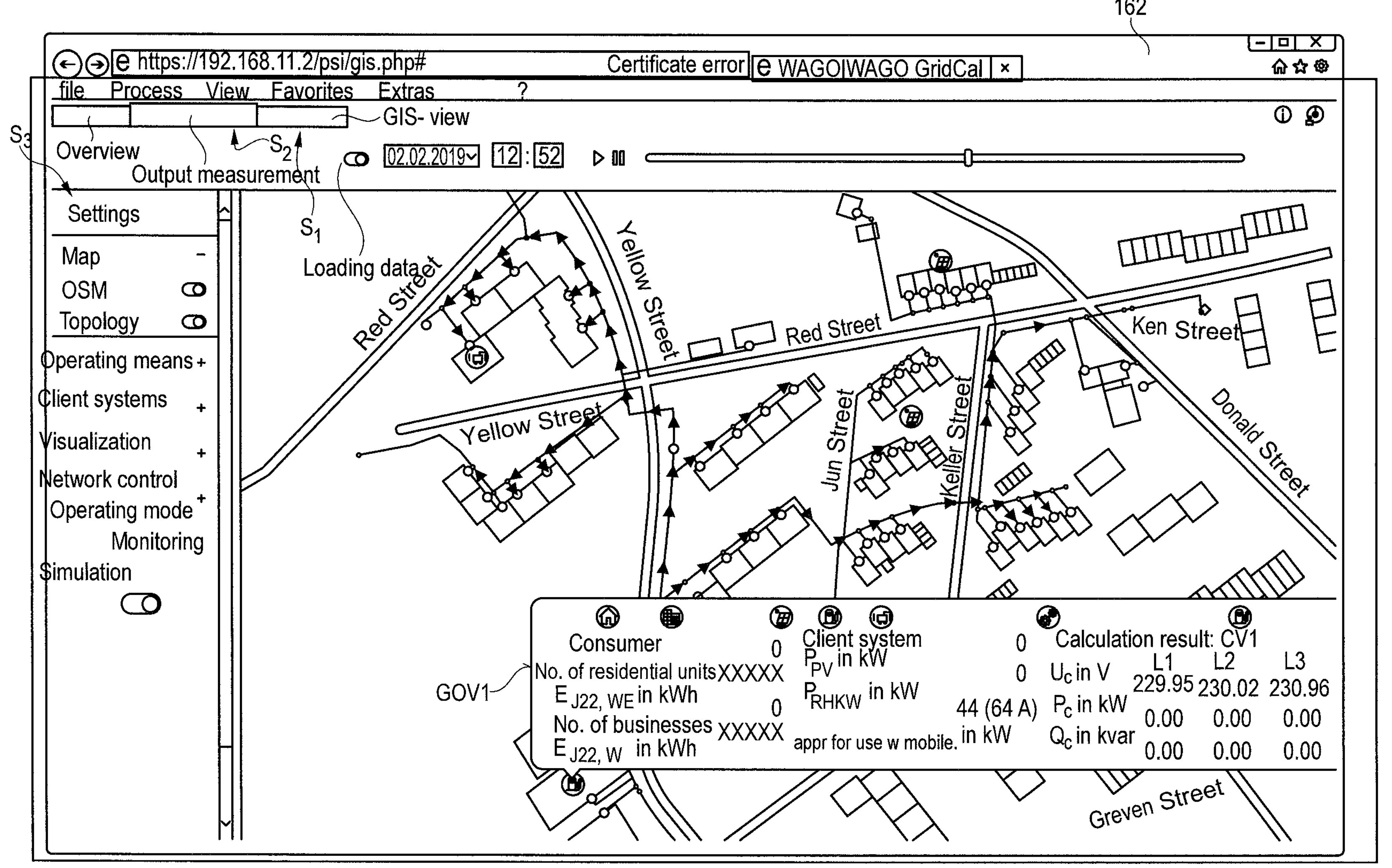
FIG. 5 is a schematic web browser view of another exemplary embodiment.

FIG. 5 shows an example of another calculation result CV1 for a consumer V1, for example a charging station for an electric vehicle. A web page 162 generated by the server 160 includes a time display 164 showing the date and time indicating for which point in time the displayed calculation result CV1 was determined.

For example, the controller 100 is arranged to display historical or current load profiles at the low-voltage feeder (hidden in FIG. 5) and/or at the transformer 19 in tabular or graphical form. For example, a display of a time series of the last 30 days with a resolution of one day or one hour is possible. For example, a calculation result CV1 for the consumer V1 is shown in FIG. 5 in an object GOV1 for Feb. 2, 2019, 12:52. To display the object GOV1, the server 160 is arranged to detect the selection of the consumer V1. For example, the consumer V1 is selected from a table (not shown).

Figure 6:
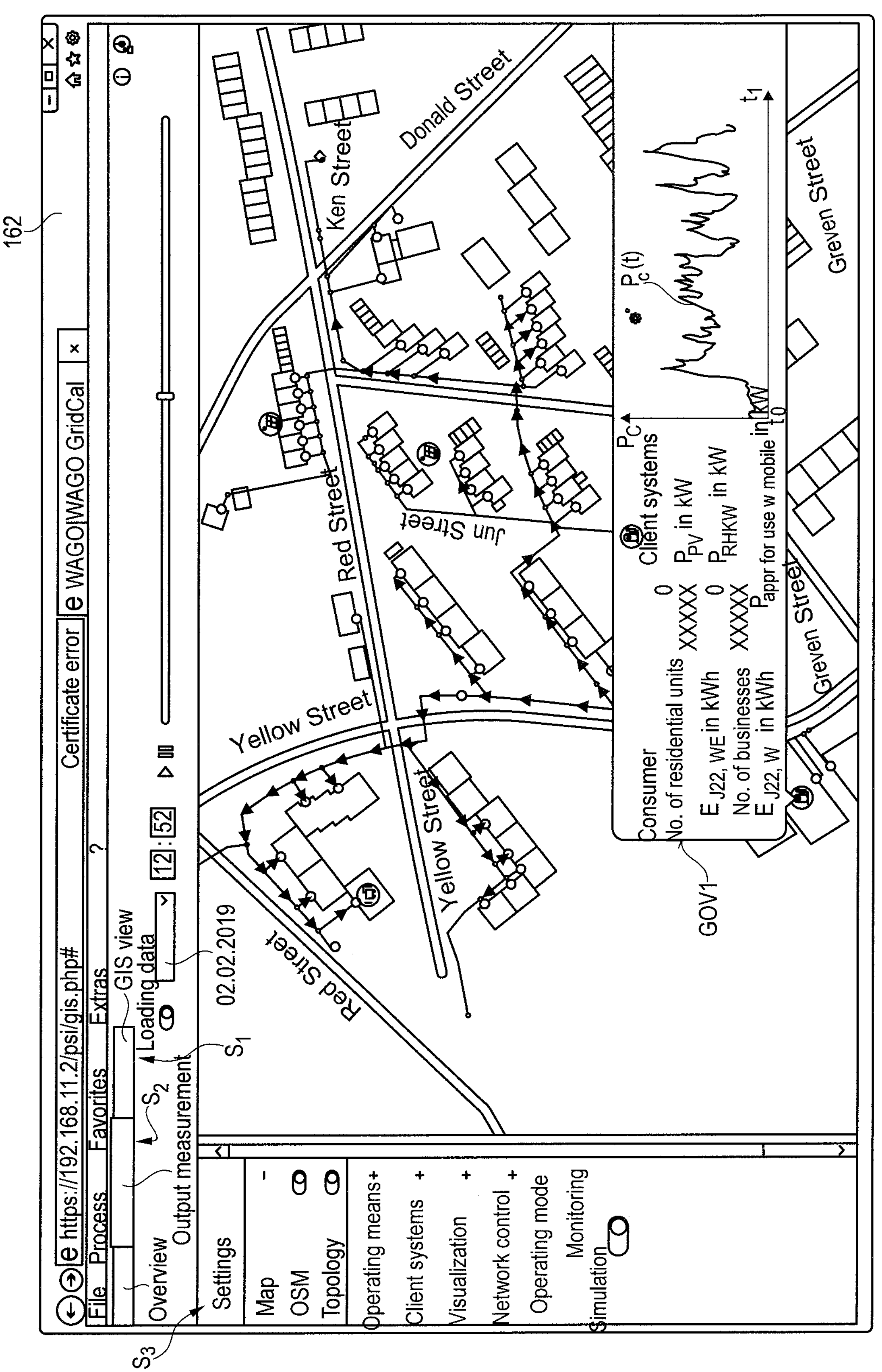
FIG. 6 is a schematic web browser view of another exemplary embodiment.

FIG. 6 shows an example of a calculation result CV1 for a consumer V1. In contrast to FIG. 5, in the exemplary embodiment of FIG. 6 a time course PC(t) of calculated electrical values is assigned to the object GOV1. Shown by way of example in FIG. 6 is the time course PC(t) of the power PC between the time t0 in the past and the current time t1. The controller 100 is set up to transmit the time history PC(t) of the calculated electrical values or a generated graphical representation, for example the object GOV1, of the time history PC(t) of the calculated electrical values via the communication interface 110.

Below, the exemplary embodiment of FIG. 1 is supplemented by a wide range control. For the realization of a wide range control, the computing application 170 in the secondary unit substation is extended and another application is implemented for the remote station in the substation. The controller 100 in the secondary unit substation 10 is arranged to cyclically send a voltage band request to a controller 910 in the substation. With the request, the controller 910 in the substation determines the most favorable voltage band and sets the transformer accordingly, for example typical 10 position changes per day. By setting the most favorable voltage band on the medium voltage side MV, the supplier can operate the medium voltage network more economically. Advantageously, the server 160 is arranged to visualize the secondary unit substation 10, which may be visually integrated in a subordinate medium voltage network. In an advantageous further development, the controller 100 is arranged to receive commands from the controller 910 in the substation and, for example, based on a current power output of the secondary unit substation 10 to control the consumption of controllable loads V1 in the distribution network 20 on the low-voltage side NV.

In the exemplary embodiment of FIG. 1, the controller 100 is connected to loads V1, V2 and/or feeders E1 via a data link CC. The data connection CC, which is also referred to as control connection CC, is shown schematically in FIG. 1 by dashed lines. It is not necessary to use a separate data line. The signals for the control connection CC are transmitted via the existing cables K1, K2, K3, K4, K5 and modulated, for example. This method is, for example, Powerline Communication PLC or is known as Powerline for short, and is also called PowerLAN or dLAN by some manufacturers. This technology uses existing electrical lines in the low-voltage network NV to set up a local network for data transmission, so that no additional data line is required. Accordingly, so-called powerline modems 211 are provided at the low-voltage feeder 11 and at the load V1, V2 and/or at the feeder E1. Consumers and/or feeders also have controllers V1C, V2C, E1C for receiving and processing control data CD.

The controller 100 in the secondary unit substation 10 is arranged to send control data CD to a producer controller E1C of a producer E1 and/or a consumer controller V1C, V2C of a consumer V1, V2 via a control connection CC. The control of the distribution network 20 at the low-voltage level NV may be performed independently of a higher-level unit 910, 920, 930. For data connection between the controller 100 and the low-voltage feeder 11, a modem 211 is shown, which may also be referred to as a coupling circuit 211. The coupling circuit 211 is used to establish the control connection CC via the distribution network connected to the low-voltage feeder 11. To obtain a higher level of security, the controller 100 and/or the coupling circuit 211 is arranged to transmit the control data CD in encrypted form via the control connection CC. In the exemplary embodiment of FIG. 1, the controller 100 is arranged to generate the control data CD based on the calculation results. For example, based on the calculation, it can be determined that a power limit is reached in a certain area of the distribution network 20, so that a command is included in the control data CD via the control connection CC that the power draw from the distribution network 20 is limited for a consumer V2, for example a charging station for an electric vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system comprising:
- a controller; and
- a 3-phase measurement sensor, wherein the 3-phase measurement sensor, at least for current measurement, is connected to a low-voltage feeder of a secondary unit substation,
- wherein a distribution network with producers and/or consumers is connected to the low-voltage feeder,
- wherein the controller and the 3-phase measurement sensor are arranged in the secondary unit substation,
- wherein the controller has a data interface for detecting electrical measurement values of the connected 3-phase measurement sensor with an associated timestamp,
- wherein the controller has a communication interface for connection to a higher-level unit outside the secondary unit substation,
- wherein the controller has a first memory area in a local memory for storing the measurement values with an associated timestamp,
- wherein the controller has, in the local memory, a second memory area for the storage of network topological data,
- wherein the network topological data has both line profiles of the distribution network and consumer profiles of the consumers and/or producer profiles of the producers of the distribution network,
- wherein the controller has a computing unit configured to:
  - receive a request via the communication interface to output an energy flow in the distribution network;
  - select a time period for measurement values with a timestamp within the time period;
  - calculate values of the energy flow based on the network topological data and the measurement values of the time period; and
  - provide a calculation result in a server of the controller for transmission via the communication interface,
- wherein the server of the controller is configured to provide the calculation results using graphical objects, the graphical objects comprising invariant graphical elements and time-varying graphical elements and the graphical objects being transmittable via the communication interface to the higher-level unit outside the secondary unit substation, and the controller is configured to provide control data to the secondary unit substation to control the energy flow in the distribution network based on the calculation results,
- wherein the secondary unit substation has a transformer connected to the low-voltage feeder for transformation between medium voltage and low voltage, and
- wherein the controller is configured to determine a most favorable voltage band and sets the transformer based on the most favorable voltage band.

2. The system according to claim 1, wherein the server of the controller is arranged to provide a plurality of services which are controllable via the communication interface.

3. The system according to claim 1, wherein the server of the controller is arranged to provide the calculation results using graphical objects, wherein the graphical objects are associated with each other and with the low-voltage feeder based on the network topological data, and/or wherein at least one of the graphical objects is associated with a calculation result, and/or wherein the graphical objects are adapted to be transmitted via the communication interface or to the higher-level unit.

4. The system according to claim 1, wherein the server of the controller is arranged to associate a time history of calculated electrical values with an object, wherein the time history of the calculated electrical values and/or a generated graphical representation of the time history of the calculated electrical values is transmittable via the communication interface.

5. The system according to claim 1, wherein the server of the controller is set up for receiving selection control data via the communication interface, and for selecting a number of graphical objects based on the selection control data.

6. The system according to claim 1, wherein the server of the controller is arranged to provide an arrangement of the graphical objects based on the network topological data in a two-dimensional or three-dimensional space, and wherein the arrangement in the space corresponds to the geography of the distribution network.

7. The system according to claim 1, wherein the controller is arranged to send, via a control connection, control data to a producer controller of a producer and/or a consumer controller of a consumer.

8. The system according to claim 7, further comprising a coupling circuit connecting the controller to a low-voltage feeder, arranged to establish the control connection via the distribution network connected to the low-voltage feeder.

9. The system according to claim 8, wherein the controller and/or the coupling circuit is arranged to transmit the control data in encrypted form via the control connection.

10. The system according to claim 1, wherein the controller is arranged to generate the control data based on the calculation result.

11. The system according to claim 1, wherein the data interface is configured to detect electrical measurements of the 3-phase measurement senor with an associated time stamp.

12. The system according to claim 1, wherein said selecting the time period for measurement values with the timestamp within the time period and said calculating values of the energy flow based on the network topological data and the measurement values of the time period are performed cyclically.

13. The system according to claim 1, wherein said selecting the time period for measurement values with the timestamp within the time period and said calculating values of the energy flow based on the network topological data and the measurement values of the time period are performed only when a request is received.

14. The system according to claim 1, wherein the controller is configured to provide a plurality of services controllable by the communication interface.

15. The system according to claim 1, wherein the controller is configured to assign a time course of calculated electrical values to an object.

16. The system according to claim 1, wherein the graphical objects are associated with each other and with the low-voltage feeder based on the network topological data.

17. The system according to claim 16, wherein at least one of the graphical objects is associated with a calculation result.

18. A system comprising:

a secondary unit substation;

a 3-phase measurement sensor arranged in the secondary unit substation, wherein the 3-phase measurement sensor, at least for current measurement, is connected to a low-voltage feeder of the secondary unit substation;

a distribution network with producers and/or consumers connected to the low-voltage feeder; and a controller arranged in the secondary unit substation, the controller comprising:

a data interface configured to detect electrical measurement values of the connected 3-phase measurement sensor with an associated timestamp;

a computing unit configured to select a time period for measurement values with a timestamp within the time period and to calculate values of the energy flow based on the network topological data and the measurement values of the time period;

a communication interface configured to connect to a higher-level unit outside the secondary unit substation, configured to receive a request to output an energy flow in the distribution network, and configured to provide a calculation result in a server of the controller for transmission via the communication interface, server of the controller being configured to provide the calculation results using graphical objects, the graphical objects comprising invariant graphical elements and time-varying graphical elements and the graphical objects being transmittable via the communication interface to the higher-level unit outside the secondary unit substation, and configured to provide control data to the secondary unit substation to control the energy flow in the distribution network based on the calculation results;

a first memory area in a local memory for storing the measurement values with an associated timestamp; and a second memory area in the local memory for the storage of network topological data, and wherein the secondary unit substation has a transformer connected to the low-voltage feeder for transformation between medium voltage and low voltage, and wherein the controller is configured to determine a most favorable voltage band and sets the transformer based on the most favorable voltage band.

* * * * *